United States Patent

Elliott

(10) Patent No.: US 10,141,588 B2
(45) Date of Patent: Nov. 27, 2018

(54) GAS CONNECTOR

(71) Applicant: Intelligent Energy Limited, Loughborough (GB)

(72) Inventor: Zachary Elliott, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 15/519,125

(22) PCT Filed: Oct. 1, 2015

(86) PCT No.: PCT/GB2015/052878
§ 371 (c)(1),
(2) Date: Apr. 13, 2017

(87) PCT Pub. No.: WO2016/059371
PCT Pub. Date: Apr. 21, 2016

(65) Prior Publication Data
US 2017/0237089 A1   Aug. 17, 2017

(30) Foreign Application Priority Data

Oct. 15, 2014  (GB) .................................. 1418295.0

(51) Int. Cl.
*H01M 8/04082* (2016.01)
*F16L 37/00* (2006.01)

(52) U.S. Cl.
CPC ....... *H01M 8/04201* (2013.01); *F16L 37/004* (2013.01); *H01M 2250/30* (2013.01)

(58) Field of Classification Search
CPC ......... H01M 8/04082; H01M 8/04201; H01M 8/04753; H01M 8/1011; H01M 2250/30
See application file for complete search history.

(56) References Cited

U.S. PATENT DOCUMENTS

| 2005/0115637 A1 | 6/2005 | Adams et al. |
| 2013/0252461 A1 | 9/2013 | Gross |
| 2015/0288010 A1 * | 10/2015 | McLean ............ H01M 8/04208 429/444 |

FOREIGN PATENT DOCUMENTS

| EP | 2642609 | 9/2013 |
| GB | 2487924 | 8/2012 |
| JP | 2003-042368 | 2/2003 |

OTHER PUBLICATIONS

International Search Report and Written Opinion in International Patent Application No. PCT/GB2015/052878 dated Jan. 7, 2016.

* cited by examiner

*Primary Examiner* — Timothy L Maust
*Assistant Examiner* — Timothy P Kelly
(74) *Attorney, Agent, or Firm* — Baker & Hostetler LLP

(57) ABSTRACT

A gas connector comprising a gas outlet port; and a reconfigurable mating interface. The mating interface is configured to provide a first mating profile and a second mating profile. The first mating profile is configured for connecting the gas connector to a first type of electronic device and the second mating profile is configured for connecting the gas connector to a second, different, type of electronic device.

17 Claims, 2 Drawing Sheets

GAS CONNECTOR

CROSS-REFERENCE TO RELATED APPLICATIONS

This patent application is a National Stage Application of international patent application PCT/GB2015/052878 filed Oct. 1, 2015, which claims priority to Great Britain patent application 1418295.0, filed Oct. 15, 2014, the disclosures of which are incorporated by reference in their entirety.

The present disclosure relates to a gas connectors for providing gaseous fuel, such as hydrogen fuel, to different types of electronic devices.

According to a first aspect of the invention, there is provided a gas connector comprising:
  a gas outlet port; and
  a reconfigurable mating interface, which is configured to provide a first mating profile and a second mating profile, wherein the first mating profile is configured for connecting the gas connector to a first type of electronic device and the second mating profile is configured for connecting the gas connector to a second, different, type of electronic device.

Such a gas connector can be advantageous because it can enable a single gas connector to be reconfigured such that it can be used with at least two different types of devices. In some examples, the first mating profile and the second mating profile can be associated with known non-gaseous connectors of the different types of devices, and therefore may require only minimal changes to the different types of devices in order for them to be connectable to a gas source.

The mating interface may define the shape of a first mechanical connector in the first mating profile. The mating interface may define the shape of a second mechanical connector in the second mating profile. The first mechanical connector may be configured to retain the gas connector in position when the gas connector is connected to the first type of electronic device. The second mechanical connector may be configured to retain the gas connector in position when the gas connector is connected to the second type of electronic device.

The first mechanical connector may define a first mating surface that is configured to be mechanically retained in two dimensions relative to a docking surface of the first type of electronic device. The mating interface may comprise a magnetic latch configured to retain the gas connector in a third dimension relative to the docking surface of the first type of electronic device. The first mating profile may comprise a MagSafe connector. The first type of electronic device may be a laptop computer.

The second mechanical connector may define a second mating surface that is configured to be mechanically retained in three dimensions relative to a docking surface of the second type of electronic device. The second mating profile may comprise a lightning connector. The second type of electronic device may be a smartphone.

The first mating profile may define a first mating surface and the second mating profile may define a second mating surface. The gas connector may further comprise a retractable mating member that is movable between a retracted position and an extended position. In the retracted position, the mating member may define a subsection of the first mating surface. In the extended position, the mating member may define the entire second mating surface.

The gas connector may further comprise a common housing that houses the gas outlet port and the mating interface.

The gas connector may be configured such that engagement of the mating interface with the first and second types of electronic devices results in the gas outlet port being aligned with a gas inlet port on a docking surface of the associated electronic device.

The mating interface may be configured to provide an electrical connection through the gas connector. Either or both of the first mating profile and the second mating profile may expose/make available electrical contacts for coupling to an associated electronic device.

The gas connector may further comprise a valve configured to prevent fluid flow through the gas outlet port when the valve is in a closed condition and to enable fluid flow through the gas outlet port when the valve is in an open condition. The valve may be configured to automatically switch to the closed condition when the gas connector is disconnected from an electronic device. The valve may be configured to automatically switch to the open condition when the gas connector is connected to an electronic device.

The gas connector may further comprise a length of flexible gas delivery pipe that terminates in the gas outlet port.

The gas connector may be a hydrogen connector, optionally for providing hydrogen as a fuel to a fuel cell. The gas outlet port may be a hydrogen outlet port.

There may be provided a connection system comprising any gas connector disclosed herein, and an electronic device. The electronic device may comprise a receiving portion of a docking surface and a gas inlet port in the docking surface. The receiving portion may be recessed such that it retains the gas connector in two dimensions. The gas outlet port may be configured to be aligned with the gas inlet port when the mating interface is connected to the receiving portion of the docking surface.

Embodiments of the present invention will now be described by way of example and with reference to the accompanying drawings in which.

Examples disclosed herein relate to a gas connector that has a reconfigurable mating interface such that the connector can be used with different types of electronic devices, without requiring substantial changes to the structure of the housing of the devices. In some examples, the gas connector is a hydrogen connector for providing hydrogen gas to fuel cells associated with the electronic devices.

Figure 1A:
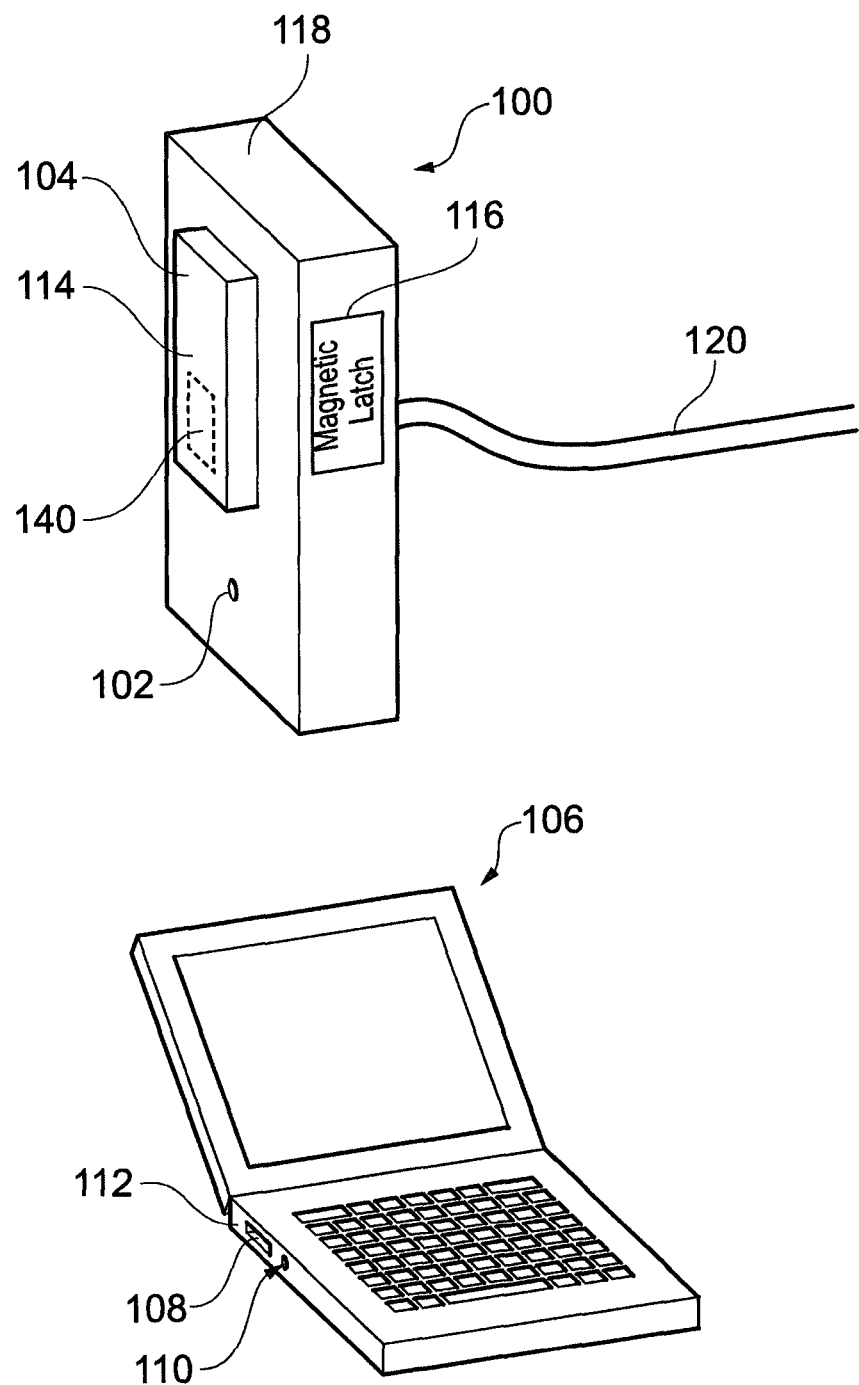
FIG. 1a shows a gas connector and a first type of electronic device.

FIG. 1a shows a gas connector 100 and a first type of electronic device, which in this example is a laptop computer 106. In this example, the gas connector is a hydrogen connector 100. The hydrogen connector 100 is shown as enlarged relative to the laptop computer 106 for ease of illustration. The laptop computer 106 comprises a hydrogen fuel cell (not shown), and therefore requires a hydrogen fuel supply. The hydrogen connector 100 is used to provide hydrogen to a hydrogen inlet port 110 on a docking surface 112 of the laptop computer 106. The hydrogen inlet port 110 is an example of a gas inlet port.

The hydrogen connector 100 includes a hydrogen outlet port 102. The hydrogen outlet port 102 is an example of a gas outlet port. The hydrogen connector 100 also includes a reconfigurable mating interface 104, which can be selectively configured to provide a first mating profile or a second mating profile. The mating interface 104 enables the hydrogen connector 100 to be retained in a correct position when the hydrogen connector 100 is connected to an electronic device such that hydrogen can flow from the hydrogen outlet port 102 to a hydrogen inlet port on the electronic device.

Figure 1B:
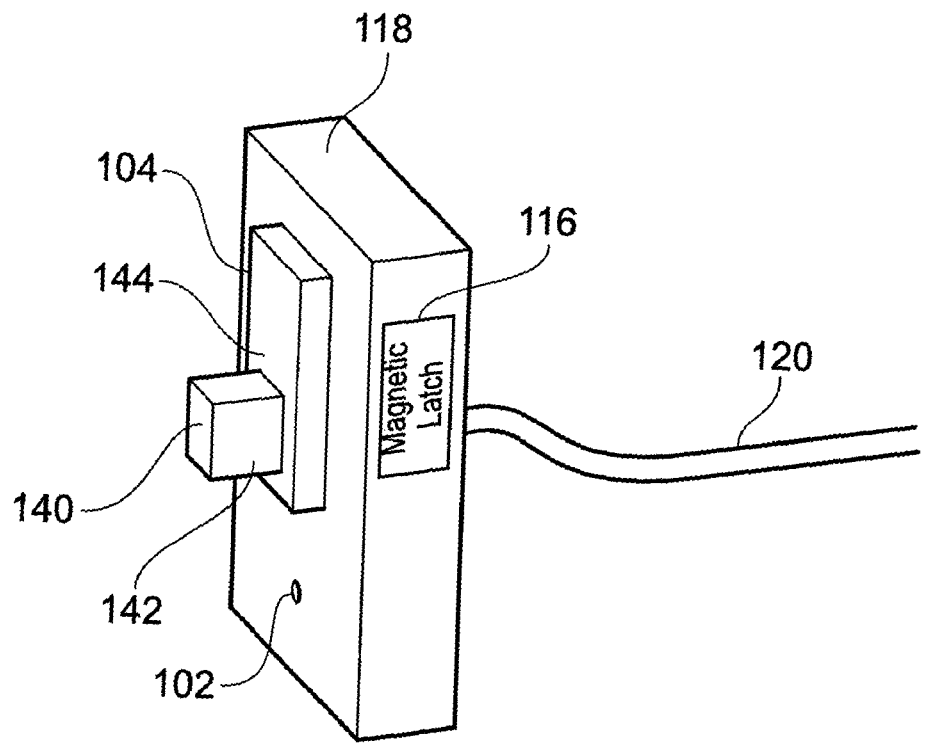
FIG. 1b shows the gas connector of FIG. 1a and a second type of electronic device.
Figure 1B:
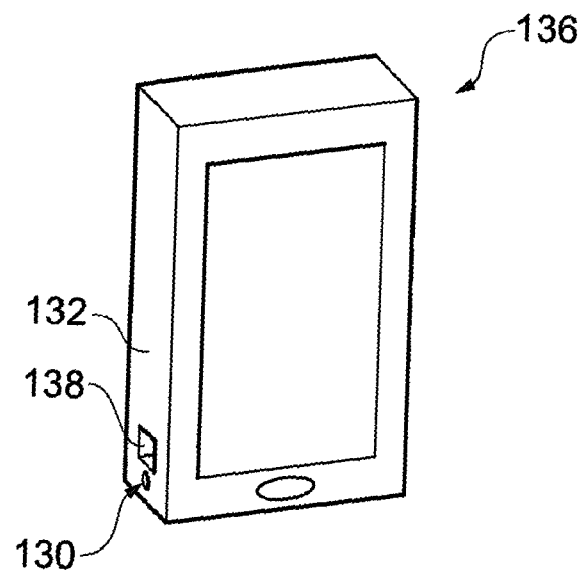

FIG. 1a illustrates the mating interface 104 when it is configured to provide the first mating profile, which is suitable for connecting the hydrogen connector 100 to the laptop computer 106. FIG. 1b, which will be described in more detail below, shows the second mating profile, which is for connecting to a second, different, type of electronic device.

Returning to FIG. 1a, in this example the mating interface 104 defines the shape of a first mechanical connector when it is in the first mating profile. The first mechanical connector, as shown in FIG. 1a, defines a first mating surface 114, which will be parallel to, and in contact with a receiving portion 108 of the docking surface 112 when the hydrogen connector 100 is connected to the laptop computer 106. The receiving portion 108 is a recess in the docking surface 112. The mating interface 104, when it defines the first mechanical connector, can mechanically retain the hydrogen connector 100 in two dimensions relative to the docking surface 112 of the laptop computer 106. This is because the first mating surface 114 is retained within the recessed receiving portion 108 of the docking surface 112 in the plane of the docking surface 108, which is also in the plane of the first mating surface 114. In this example the two dimensions are orthogonal dimensions and can be considered as x and y dimensions.

In FIG. 1a, the hydrogen connector 100 also includes a magnetic latch 116, which can retain the hydrogen connector 100 in a third dimension (z dimension) relative to the docking 108 surface of the laptop computer 106. More particularly, the magnetic latch 116 causes the mating surface 114 to be attracted to the receiving portion 108 of the docking surface 108 when they are close enough together. The coming together of the mating surface 114 and the recessed receiving portion 108 of the docking surface 112 in the z dimension causes the hydrogen connector 100 to be correctly located and aligned in the x and y dimensions such that the hydrogen outlet port 102 on the hydrogen connector 100 is aligned with the hydrogen inlet port 110 on the laptop computer 106.

An example of the first mating profile described with reference to FIG. 1a is one that is associated with a MagSafe connector.

The hydrogen connector 100 has a single housing 118 that houses both the hydrogen outlet port 102 and the mating interface 104. In this way, the mating interface 104 and the hydrogen outlet port 102 can be said to be provided as part of a unitary component. Advantageously, use of such a unitary component, with the hydrogen outlet port 102 and the mating interface 104 in close proximity to each other, can require only a small modification to the laptop computer 106 (or other electronic device that can be used with the hydrogen connector 100) for it to be capable of receiving hydrogen as a fuel. This small modification is the addition of a hydrogen inlet port 110 in the vicinity of an existing connector, such as the receiving portion 108 of the laptop computer 106. The hydrogen inlet port 110 can be provided within a footprint on the docking surface 112, wherein the footprint is defined by the perimeter of the housing 118 of the hydrogen connector 100 when it is connected to the laptop computer 106. Intuitively, the existing connector may be one that is expected to receive electrical power, such as is the case with the MagSafe connector.

The hydrogen connector 100 in this example also includes a length of flexible hydrogen delivery pipe 120 that terminates in the hydrogen outlet port 102. In this way, the hydrogen connector 100 can be used as a "flying lead" or "umbilical connection" from a fuel source to a fuel consuming device where the fuel source and consuming device are formed in separate housings which do not necessarily remain in fixed spatial relationship to one another during use, for example where a user is holding or manipulating the fuel consuming device.

FIG. 1b shows the hydrogen connector 100 of FIG. 1a with the mating interface 104 providing the second mating profile, and also shows a second type of electronic device. The second type of electronic device in this example is a smartphone 136. The hydrogen connector 100 is shown as enlarged relative to the smartphone 136 for ease of illustration. The smart phone 136 comprises a hydrogen fuel cell (not shown), and therefore requires a hydrogen fuel supply. The hydrogen connector 100 is used to provide hydrogen to a hydrogen inlet port 130 on a docking surface 132 of the smart phone 136.

The mating interface 104 defines the shape of a second mechanical connector when it is in the second mating profile. The second mechanical connector, as shown in FIG. 1b, defines a second mating surface 140, which will be parallel to, and in contact with, a receiving portion 138 of the docking surface 132 when the hydrogen connector 100 is connected to the smart phone 136. The receiving portion 108 is a recess in the docking surface 112.

The second mating surface 140 is a subsection of the first mating surface that is shown in FIG. 1a. The second mating surface 140 is provided on a distal end of a retractable/movable mating member 142 that is movable between a retracted position as shown in FIG. 1a, and an extended position as shown in FIG. 1b. In this example, the mating member 142 defines a subsection of the first mating surface when it is in the retracted position, and the mating member 142 defines the entire second mating surface 140 when it is in the extended position.

The mating interface 104, when it defines the second mechanical connector, as shown in FIG. 1b, can mechanically retain the hydrogen connector 100 in three dimensions relative to the docking surface 132 of the smart phone 136. This can be because the mating member 140 extends far enough into the housing of the smart phone 136 such that a releasable mechanical attachment can be made. Such releasable mechanical attachment can be a friction fit or can use a resiliently biased member. These three dimensions may be considered as x, y and z dimensions.

An example of the second mating profile described with reference to FIG. 1b is one that is associated with a lightning connector.

Optionally, the mating interface 104 is configured to provide an electrical connection through the hydrogen connector 100. Either or both of the first mating profile and the second mating profile may expose/make available electrical contacts for coupling to an associated electronic device, for example by exposing electrical contacts as part of the mating surface. The electrical connection can advantageously be used for data communication from the electronic device that receives hydrogen (such as the laptop computer 106 or the smart phone 136) to a device that provides the hydrogen (such as a hydrogen containment vessel or associated processor), and/or vice versa.

It will be appreciated that the hydrogen connector 100 is configured such that engagement of the mating interface 104 with either of the first and second types of electronic devices results in the hydrogen outlet port 102 being aligned with a hydrogen inlet port on a docking surface of the associated electronic device.

The hydrogen connector 100 may further comprise a valve (not shown) that can prevent fluid flow out of the hydrogen outlet port 102 when the valve is in a closed condition, and can enable fluid flow out of the hydrogen outlet port 102 when the valve is in an open condition. The valve may automatically switch to the closed condition when the hydrogen connector 100 is disconnected from an electronic device. The valve may automatically switch to the open condition when the hydrogen connector 100 is connected to an electronic device.

The hydrogen connector 100 along with an electronic device comprising a receiving portion of a docking surface and a hydrogen inlet port in the docking surface can together be considered as a connection system. Such a connection system can advantageously enable hydrogen fuel to be provided to an electronic device without requiring any additional components to latch the hydrogen connector to the electronic device, such that a hydrogen flow path into the electronic device can be provided.

The invention claimed is:

1. A gas connector comprising:
   a gas outlet port; and,
   a reconfigurable mating interface, which is configured to provide a first mating profile and a second mating profile, wherein the first mating profile is configured for connecting the gas connector to a first type of electronic device and the second mating profile is configured for connecting the gas connector to a second, different, type of electronic device,
   wherein the first mating profile defines a first mating surface and the second mating profile defines a second mating surface, the gas connector further comprising a retractable mating member that is movable between a retracted position and an extended position, wherein, in the retracted position the mating member defines a subsection of the first mating surface, and in the extended position the mating member defines the entire second mating surface.

2. The gas connector of claim 1, wherein the mating interface defines a first shape of a first mechanical connector in the first mating profile, and defines a second shape of a second mechanical connector in the second mating profile.

3. The gas connector of claim 2, wherein the first mechanical connector is configured to retain the gas connector in position when the gas connector is connected to the first type of electronic device, and the second mechanical connector is configured to retain the gas connector in position when the gas connector is connected to the second type of electronic device.

4. The gas connector of claim 3, wherein the first mechanical connector defines a first mating surface that is configured to be mechanically retained in two dimensions relative to a docking surface of the first type of electronic device.

5. The gas connector of claim 4, wherein the mating interface comprises a magnetic latch configured to retain the gas connector in a third dimension relative to the docking surface of the first type of electronic device.

6. The gas connector of claim 1, wherein the first type of electronic device is a laptop computer.

7. The gas connector of claim 2, wherein the second mechanical connector defines a second mating surface that is configured to be mechanically retained in three dimensions relative to a docking surface of the second type of electronic device.

8. The gas connector of claim 1, wherein the second type of electronic device is a smartphone.

9. The gas connector of claim 1, further comprising a common housing that houses the gas outlet port and the mating interface.

10. The gas connector of claim 1, wherein the gas connector is configured such that engagement of the mating interface with the first and second types of electronic devices results in the gas outlet port being aligned with a gas inlet port on a docking surface of the associated electronic device.

11. The gas connector of claim 1, wherein the mating interface is configured to provide an electrical connection through the gas connector.

12. The gas connector of claim 11, wherein either or both of the first mating profile and the second mating profile expose electrical contacts for coupling to an associated electronic device.

13. The gas connector of claim 1, further comprising a valve configured to prevent fluid flow through the gas outlet port when the valve is in a closed condition and to enable fluid flow through the gas outlet port when the valve is in an open condition.

14. The gas connector of claim 13, wherein the valve is configured to automatically switch to the closed condition when the gas connector is disconnected from an electronic device, and is configured to automatically switch to the open condition when the gas connector is connected to an electronic device.

15. The gas connector of claim 1, further comprising a length of flexible gas delivery pipe that terminates in the gas outlet port.

16. The gas connector of claim 1, wherein the gas connector is a hydrogen connector and the gas outlet port is a hydrogen outlet port.

17. A connection system comprising the gas connector of claim 1, and an electronic device, the electronic device comprising a receiving portion of a docking surface and a gas inlet port in the docking surface, wherein the gas outlet port is configured to be aligned with the gas inlet port when the mating interface is connected to the receiving portion of the docking surface.

* * * * *